United States Patent [19]
Hohmann, Jr.

[11] Patent Number: 5,556,226
[45] Date of Patent: Sep. 17, 1996

[54] AUTOMATED, LASER ALIGNED LEVELING APPARATUS

[75] Inventor: Howard E. Hohmann, Jr., Saxonburg, Pa.

[73] Assignee: Garceveur Corporation, Louisville, Ky.

[21] Appl. No.: 391,200

[22] Filed: Feb. 21, 1995

[51] Int. Cl.$^6$ .................................................. E01C 23/07
[52] U.S. Cl. .......................... 404/84.1; 404/84.5; 404/101
[58] Field of Search ............................ 404/72, 75, 84.05, 404/84.5, 84.1, 84.2, 101, 103, 110, 114, 118

[56] References Cited

U.S. PATENT DOCUMENTS

| | | | |
|---|---|---|---|
| 4,655,633 | 4/1987 | Somero et al. | 404/75 |
| 4,930,935 | 6/1990 | Quenzi et al. | 404/75 |
| 5,078,215 | 1/1992 | Nau | 172/4.5 |
| 5,107,932 | 4/1992 | Zachman et al. | 172/4.5 |
| 5,129,803 | 7/1992 | Nomura et al. | 404/84.05 |

*Primary Examiner*—David J. Bagnell
*Assistant Examiner*—Pamela A. O'Connor
*Attorney, Agent, or Firm*—John E. Vanderburgh

[57] ABSTRACT

The laser alignment system of apparatus for leveling flowable material, in which two radiant energy beam detectors mounted on opposite ends of an elongated leveling member are responsive to a projected radiant energy beam establishing a leveling plane, is modified for operation when one of the detectors is blocked from receiving the projected radiant energy bean by an obstruction such as a support column, equipment or personnel. Whereas each detector signal is normally used to generate a separate adjustment signal for an adjustment device such as an hydraulic cylinder to raise or lower the associated end of the elongated leveling member, when one detector is blocked from receiving the radiant energy beam the detector elevation signal generated by the other, unblocked, detector is used to generate the adjustment signals for both ends of the elongated leveling member.

10 Claims, 3 Drawing Sheets

AUTOMATED, LASER ALIGNED LEVELING APPARATUS

BACKGROUND OF THE INVENTION

1. Field of the Invention

This invention relates to apparatus for leveling flowable materials such as concrete, asphalt, dirt and gravel in which an elongated leveling member is maintained in alignment with a desired leveling plane by a laser alignment system. In particular, it relates to an improvement in such a system having a pair of laser beam detectors on opposite ends of the elongated leveling member so that the system can maintain leveling accuracy when one of the detectors is temporarily blocked from receiving the laser bean such as by a support column, a truck, personnel or other obstruction.

2. Background Information

The invention has particular application to concrete screeds, but has application to other apparatus for leveling flowable materials such as, for instance, graders.

The concrete screed is a device used when pouring and leveling (i.e., screeding) large concrete floors, such as used in large warehouse buildings, department stores and other large area construction projects as well as large outdoor concrete areas. Examples of concrete screeds are provided in U.S. Pat. Nos. 4,655,633 and 4,930,935. These machines consist of a self propelled, rotating turret supporting a large telescoping or extendable boom, which can typically extend 20 feet from the turret. At the end of the boom is a self adjusting screed head, typically about 13 feet wide, which can automatically maintain a level position regardless of the machine's position. During the pouring of a large concrete floor, trucks deliver the concrete and discharge it on the ground. The screed head is positioned at the head of the freshly discharged concrete at exactly the desired horizontal height. The screed head is then smoothly pulled toward the turret by the boom, thereby evenly leveling and consolidating the concrete at exactly the desired horizontal height. The screed head is then repositioned to an adjacent location where fresh concrete has been placed by a truck. Again, the screed head is retracted toward the turret creating another section of smooth, (screeded) concrete.

One of the important features of these prior art concrete screeds is that they produce an extremely flat, level concrete floor in a short time-period. Each of the individually screeded sections matches the height of the adjacent sections with precision. In order to accomplish this, an automatic laser alignment system is provided. A laser projector is first installed outside the perimeter of the area to be poured. The laser projector generates a beam which is swept in a horizontal plane to provide an extremely flat leveling plane, normally several feet above the ground. Sensors responsive to the laser beam are located on posts at both ends of the moveable screed head. These sensors monitor the beam location relative to the end posts and therefore can transmit electrical signals indicating how much the leveling plane is above or below the desired location on the end posts. Vertical actuators, such as hydraulic cylinders, are provided for both ends of the screed head. These vertical actuators allow each end of the screed head to be vertically moved so that the respective ends are kept within a very small tolerance of a desired vertical position as the screed head pulls the concrete toward the turret. A controller provides automatic control of the screed end positions, and therefore, screed height and levelness, during the pulling of the concrete. For example, if the controller detects that the laser beam is moving down on a screed end sensor it provides signals to the actuator (such as to solenoid valves for the hydraulic cylinder) for that end to move the screed end down until the beam is centered again on the sensor. As the screed is moved from position to position, the screed head always reestablishes and maintains the correct vertical location of both ends by means of the laser alignment system.

The commercial embodiment of the concrete screed described in the above patents is known as the LASER SCREED (trademark Somero Enterprises, Inc.). The LASER SCREED incorporates a feature which provides frequent control corrections for the screed end height. The self-propelled frame has stabilizer legs by which it can be tilted so that the boom retracts along an upward 2% grade (i.e., the boom is angled upwards from its free end to the turret). As the boom end is pulled toward the turret, it is gradually rising in elevation. However, the laser sensors on the screed head ends are rapidly and continually sensing the height of the screed end posts. When the screed end post height increases by the very small margins permitted by the machine (i.e., ⅛" increase), the laser sensors send a signal to the central processing unit to adjust the screed end post height back down to the desired elevation. In this manner, each side of the screed head is independently and automatically controlled to stay within a very narrow elevation tolerance band. This provides for a practically seamless control of concrete height between adjacent sections that are pulled, plus providing a very flat, level surface within the pulled section. The operator merely has to command the screed boom to be retracted and the concrete is automatically screeded to the correct height, blending with a height of adjacent concrete sections.

While the laser screed works very well, there is one problem which has remained unsolved during the eight (8) years since the introduction of the LASER SCREED. The laser sensors can only function if they have an unobstructed view of an alignment source. If the laser beam is broken by an object, such as a building vertical support column, then the sensor will not provide a signal to the controller, and the affected screed end will not automatically adjust its height. Unfortunately, most building sites have a dozen or even several dozen, vertical support columns which are in place when the concrete floor is poured. As the screed is moved around the floor, pulling the numerous section of concrete, the vertical support columns frequently block the laser beam from hitting the sensors during part of each pull. This interference is called "column block" and it disrupts the automatic operation of the laser screed. Without a control signal, the controller unit does not know how to adjust the screed end. Therefore, an instrument light is provided to inform the operator that there is column block on the affected sensor. The operator must immediately assume manual height control of the affected screed end when the column block light is illuminated. The boom continues to pull toward the turret at its set speed. Because of the 2% upward grade established for the boom, the height of the screed end must somehow be adjusted to prevent the screed end from also rising at the 2% grade and therefore ruining the floor flatness. The operator must manually control the screed end height and estimate the correct height corrections as the boom is retracted until the sensor moves into a position where it is unblocked. At this point, the automatic system becomes active again. Unless the manual corrections were made reasonably accurately, the screed end is abruptly moved to its correct height. This corrective movement can cause an unwanted wave or disruption in the floor surface. It should be noted that while the boom is retracting, the operator is often rotating the turret right or left in response to obstacles (such as the vertical columns) and is checking around the machine to make sure that none of the numerous personnel or their equipment are getting too close to the machine. It is therefore very undesirable to also require the operator to continually monitor whether column block exists. In spite of these unwanted characteristics, there has been no solution to the problem of "column block" up to this point. It has also been found that in some jobs, "column block" is more frequently caused by the trucks delivering the concrete and other equipment rather than the vertical columns. Thus, this provides even more incentive to find a solution to the problem.

There is a need, therefore, for an improved laser aligned apparatus for leveling flowable materials, and in particular for concrete screeds.

There is a specific need for such improved apparatus which can maintain floor levelness when one of the sensors becomes blinded by an obstruction.

There is an additional need for such improved apparatus which responds automatically to blinding of one of the laser detectors.

SUMMARY OF THE INVENTION

These needs and others are satisfied by the invention which is directed to apparatus for leveling flowable material having a control device which, when one radiant energy beam sensor is blocked by an obstruction from receiving the projected beam of radiant energy and therefore does not generate a signal indicating an elevation deviation, sends the detector signal from the unblocked sensor to the adjustment mechanisms at both ends of the elongated leveling member until the blocked sensor clears the obstruction and again begins to generate elevation deviation signals.

In one embodiment of the invention, switching control means is inserted between the controller which generates the adjustment signals, such as for solenoid valves for hydraulic actuators adjusting the elevation of the ends of the elongated leveling member, and the solenoid valves. In this embodiment, the switching control means, which includes a processor such as a programmable logic controller (PLC), has a timer which repetitively times an interval longer than the duration between adjustment signals when the elongated leveling device is moved along a boom included at a predetermined angle to the projected leveling plane. Absence of an adjustment signal during this interval is an indication that the associated detector is blinded, and initiates application of the adjustment signal from the unblinded side to the solenoid valves on both sides. When an adjustment signal is again received from the detector that was blinded, indicating that it has cleared the obstruction, the respective adjustment signals are sent to the associated adjustment mechanisms (i.e., solenoid valves).

In another embodiment of the invention, the intelligent switch is placed between the sensors and the controllers which generate the adjustment signals. As the sensors continuously send signals to the controllers which indicate the position of the sensor relative to the projected leveling plane, the switching means can immediately detect that a sensor has been blocked from receiving the radiant energy beam, such as by an obstruction. Thus, the switching means immediately applies the signal from the unblocked sensor to both inputs to the controller means for generating both adjustment signals.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
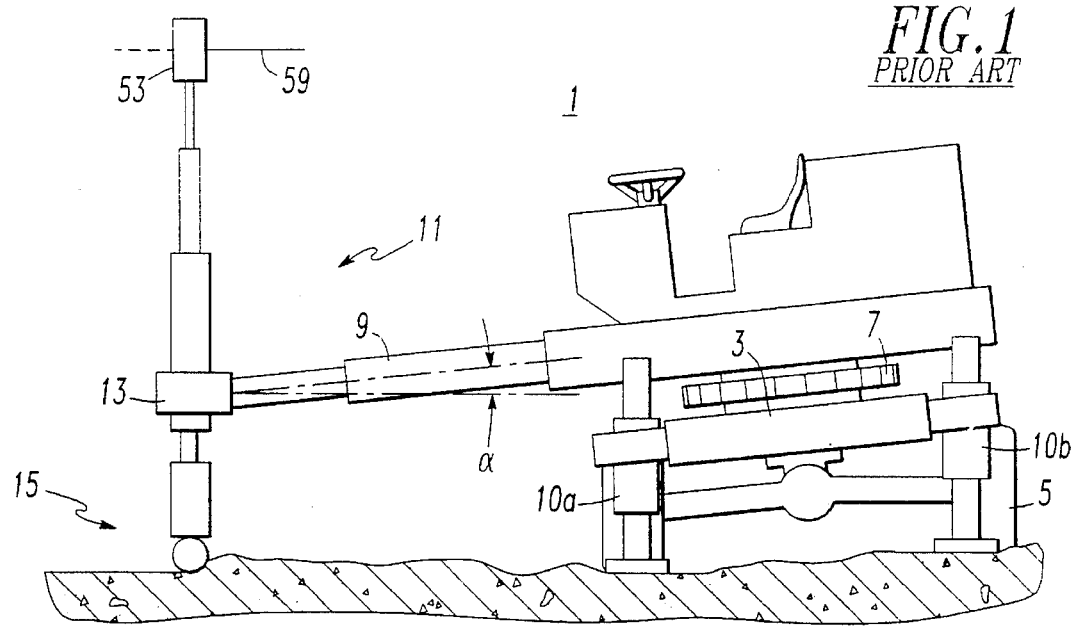
FIG. 1 is a partially schematic side elevation view of leveling apparatus of prior art design.

The invention will be described as applied to a laser aligned concrete screed; however, it will be realized by those skilled in the art that the invention is application to other apparatus for leveling flowable materials such as for instance graders.

The concrete screed 1 is of the type disclosed in U.S. Pat. No. 4,655,633, and in particular that described in U.S. Pat. No. 4,920,935, both of which are hereby incorporated by reference. The concrete screed 1 includes a self-propelled frame 3 mounted on steerable wheels 5. Mounted on the frame 3 is a rotatable turret 7 which supports a cantilevered, telescoping boom 9. Mounted on the free end of the boom 9 is a screed assembly 11, the details of which can be understood by reference to U.S. Pat. No. 4,930,935. The frame 9, has front and rear stabilizer legs 10a and 10b which can be separately adjusted to position the boom 9 at an angle α relative to the horizontal using a level gauge (not shown). Preferably, the angle α is set to establish about a 2% upward grade for the boom.

The screed assembly 11 includes a horizontal support member 13 secured at its center to the end of the boom 9. An elongated leveling member in the form of screed 15 having a longitudinal axis 16 is suspended at one end 17 from the horizontal support 13 by a screed elevation tube 19 and at the other end 21 by the elevation tube 23. The elevation tubes 19 and 23 respectively form part of elevation adjustment mechanisms 25 and 27.

The elevation adjustment mechanism 25 includes a guide tube 29 secured to the one end 17 of the horizontal support 13 and in which the elevation tube 19 is vertically slidable. A double acting hydraulic cylinder 31 is mounted at its lower end to the guide tube or horizontal support 13 and has its actuator rod 33 connected to the upper end of the elevation tube 19 so that operation of the hydraulic actuator 31 raises and lowers the elevation tube 19, and therefore, adjusts the elevation of the end 17 of the screed 15 relative to the horizontal support 13. Similarly, the elevation adjustment mechanism 27 includes the guide tube 35 in which the elevation tube 23 is vertically positioned by the hydraulic actuator 37 having its actuator rod 39 connected to the upper end of the elevation tube 23.

The hydraulic actuators 31 and 37 are operated by solenoid valves 41 and 43, respectively, which control the flow of hydraulic fluid provided by a pump 45 through hydraulic lines 47. The solenoid valves 41 and 43 are controlled by adjustment signals provided by a laser alignment system 49. The alignment system 49 includes a pair of spaced apart laser beam detectors 51 and 53 supported by masts or posts 55 and 57 mounted on top of the elevation tubes 19 and 23 at the first and second ends 17 and 21, respectively, of the screed assembly 11. These laser beam detectors 51 and 53 may be, for instance, of the type sold under Model No. R2S or R2N by Spectra-Physics Laserplane, Inc. Construction and Agricultural Division of Dayton, Ohio. These receivers are 360° OMNI-directional receivers which detect the position of a projected leveling plane 59 generated by a laser beam from a laser beacon projector 61. The projector can be of the type sold under model numbers EL1,1044-L or 945 also by Spectra-Physics Construction and Agricultural Division of Dayton, Ohio. The laser projector 61 is positioned off to the side of the area where concrete is to be screeded. The laser beam detectors 51 and 53 generate a pair of signals which provide an indication of the elevation of the respective detectors relative to the projected leveling plane 59. The two signals generated by the laser detector 51 are transmitted over leads 63 and 65 to a controller unit 67. This controller may be of the type sold under Model No. CB20T0 also by Spectra-Physics. The detector 51 generates a steady high level logic signal on the lead 63 if the detector 51 is low relative to the projected leveling plane 59. Under these conditions a pulse signal is routed on the lead 65. If the detector 51 is high relative to the projected leveling plane 59 a steady high logic level signal is generated on the lead 65 and the pulse signal is present on the lead 63. When the elevation of the detector 51 is in alignment with the elevation of the projected leveling plane 59, a steady high level logic signal is generated on both leads 63 and 65. If the detector 51 does not detect the reference laser beam, as when the beam is blocked by an obstruction such as the support column 68, the pulse signal is generated on both leads 63 and 65.

The controller unit 67 generates first adjustment signals on the leads 69 and 71 in response to the signals received on the leads 63 and 65. In the systems of U.S. Pat. Nos. 4,655,633 and 4,930,935, these adjustment signals were applied directly to tile solenoid valve 41 to raise or lower the first end 17 of the laser screed to bring the detector 51 into alignment with the projected leveling plane 59. The laser detector 53 generates similar signals on leads 73 and 75 which are utilized by the controller unit 77 to generate second adjustment signals on the leads 79 and 81 for operation of the solenoid valve 43.

The controller units 67 and 77 are each provided with three indicator lights: a center green light 83 indicating that the respective detector 51 or 53 is vertically aligned with the projected leveling plane 59; an upper orange light 85 indicating that the detector is above the projected leveling plane 59; and a second lower orange light 87 indicating that the detector is below the projected leveling plane. Under normal circumstances, the system automatically maintains both ends of the screed 15 at proper elevation relative to the projected leveling plane 59, and the lights provide the operator with an indication that the automatic system is accomplishing this task. However, when one of the detectors becomes blocked from receiving the projected laser beams such as by the column 68, a track or other equipment, or even a worker, the automatic system can no longer adjust the elevation of the end of the screed assembly 11 having the blocked detector. According to the present state of the art, the operator must take over and operate a hand control 89 to provide inputs to the blocked side. As discussed above, this is not completely satisfactory, as the operator does not have precise information on the elevation of the affected end of the screed. This can cause unevenness in the floor, especially at the point where the detector becomes unblocked and makes what may be a gross correction to bring the associated end of the screed back into proper alignment.

As was discussed above, the boom 9 on which the screed assembly 11 is carried, is supposed at an angle α which produces about a 2% upward grade relative to the horizontal, and therefore, to the project leveling plane 59. Thus, as the screed assembly 11 is pulled toward the frame 3, the screed 15 rises. This requires periodic adjustment downward of the elevation tubes 19 and 23 to maintain a level floor. Thus, first and second adjustment signals are regularly generated by the controller units 67 and 77. In accordance with the embodiment of the invention illustrated in FIG. 2, a switching control 91 is interposed in the lines 69, 71, and 79, 81 between the controller units 67 and 77 and the solenoid valves 41 and 43. The switching control 91 monitors the adjustment signals generated by the controller units 67 and 77. With the screed assembly 11 being translated by the boom 9 at a constant rate, the adjustment signals should be generated at specified intervals as the screed assembly is raised by the angled boom 9. If the switching unit 91 does not detect the adjustment signals from a controller unit 67 or 77 for this specified interva l, it determines that the associated detector 51 or 53 is blocked. Under these conditions, the switching control 91 switches the adjustment signals from the controller unit associated with the unblocked detector to the solenoid valve associated with the block detector so that both of the solenoid valves then receive the adjustment signal generated from the unblocked detector.

When the switching control 91 again detects adjustment signals from the controller unit associated with the formally blocked detector, indicating that that detector is now seeing the laser bean, the respective adjustment signals are again directed to the associated solenoid valves. Thus, in the example shown in FIG. 2, where the detector 51 becomes blocked by the column 68 so that adjustment signals are no longer generated on the leads 69 and 71 by the controller unit 67, the switching control 91 applies the adjusnnent signals generated on the leads 79 and 81 by the other controller unit 77 to the solenoid valve 41 over the leads 93 and 95, as well as, sending those signals over to leads 97 and 99 to the associated solenoid valve 43. If the switching controller 91 detects that both of the detectors are blocked it sounds an audible alarm 101 and blinks a light 103 to indicate this condition to the operator. Obviously, manual control must be applied until at least one detector becomes unblocked.

Figure 3:
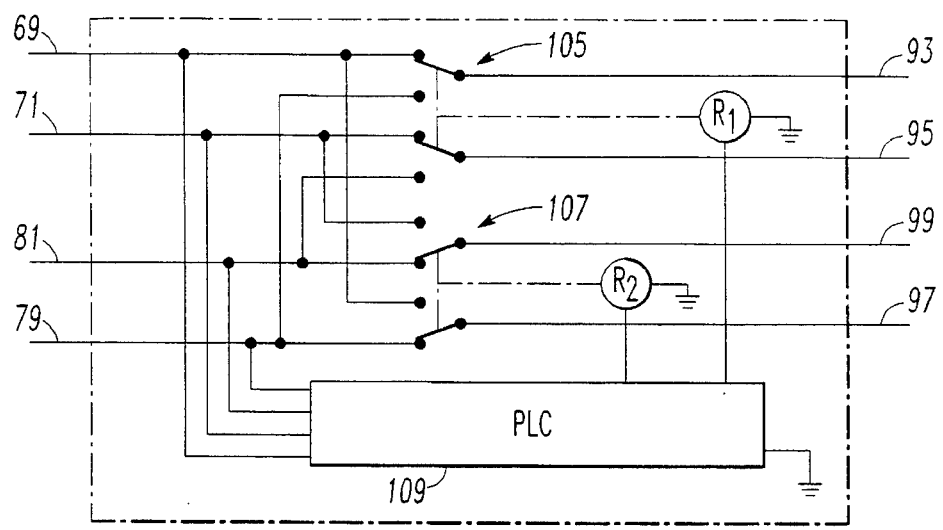
FIG. 3 is a schematic diagram illustrating in more detail a portion of the control system of FIG. 2.

FIG. 3 is a schematic diagram of the switching control 91. The switching control 91 includes 2 two-pole, double throw, relay switches 105 and 107. Operation of the relays is controlled by a processor in the form of a programmable logic controller (PLC) 109. The PLC 109 monitors the signals on the leads 69, 71, 79 and 81, and when it detects the absence of adjustment signals on one of the pairs of these leads, it energizes the coil of the appropriate relay 105 or 107 to transfer the signals on the other pair of lines to the affected lines. The switches 105 and 107 are shown in their normal, unenergized states which prevails when both of the laser detectors are receiving the laser beam. Under these conditions, the signals on leads 69 and 71 are applied to the leads 93 and 95 for operation of the solenoid valve 41, while the leads 79 and 81 are connected to the leads 97 and 99 for providing adjustment signals to the solenoid 43. When, for instance, the detector 51 becomes blocked so that the adjustment signals are not being generated on the leads 69 and 71, the PLC 109 activates a driver which energizes the coil $R_1$ of the relay 105, so that the adjustment signals on the leads 79 and 81 are applied to the leads 93 and 95, as well as to the leads 97 and 99. The coil $R_2$ of the relay 107 is energized when the detector 53 is blocked so that the adjustment signals on a leads 69 and 71 are applied to the leads 97 and 99 for energizing the solenoid valve 43.

Figure 2:
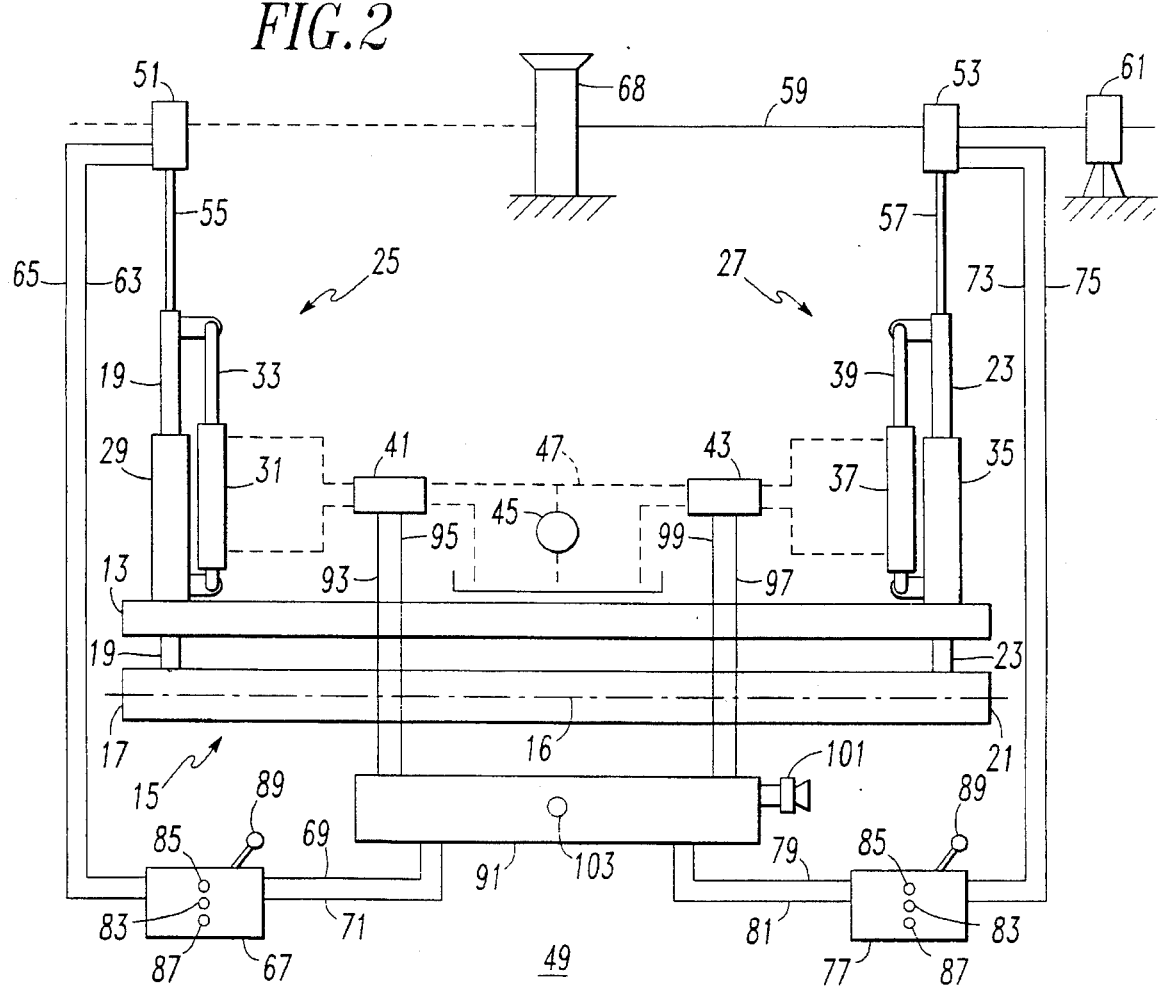
FIG. 2 is a schematic laser leveling control system for the apparatus of FIG. 1.
Figure 4:
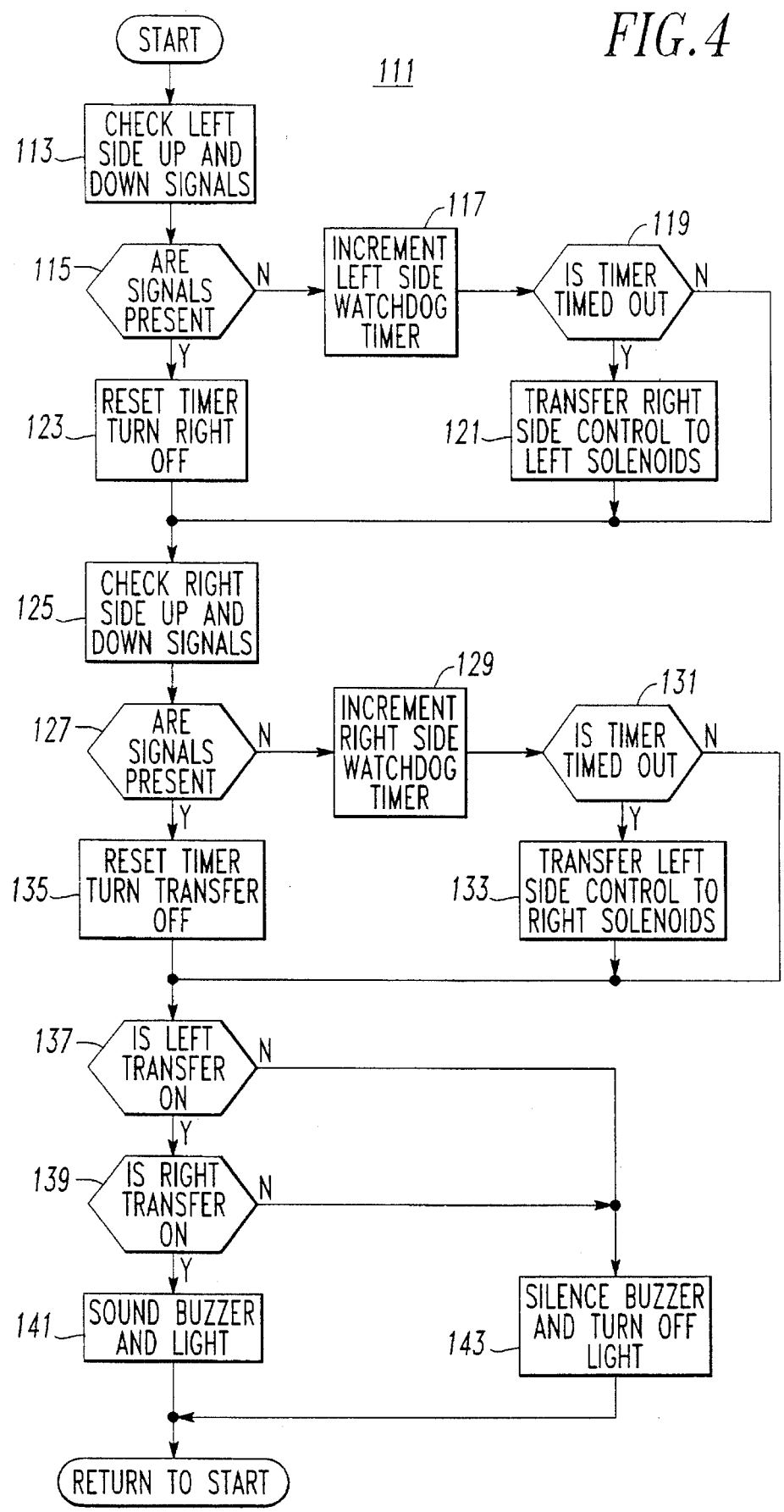
FIG. 4 is a logic flow chart for the control system of FIG. 2.

FIG. 4 is a flow chart 111 of the logic implemented by the PLC 109 for the embodiment of the invention illustrated in FIGS. 2 and 3. The PLC 109 first checks the left side (e.g. controller 67) for an indication of an up or down signal as indicated at 113. If no signals are present at 115, a left side timer is incremented at 117. If the timer is tinned out, indicating the absence of adjustment signals from the left side for longer than would be expected, thus indicating that the left side detector is blocked as determined at 119, the relay such as relay 105 is operated at 121 to provide the right side adjustment signals to the left solenoid. If a left side signal is present at 115, the left side timer is reset at 123.

The routine 111 then checks for right side up and down adjustment signals at 125. If no such signals are present, as determined at 127, a right side timer is incremented at 129. If this timer has timed out, indicating that the fight side detector (e.g. 53) is blocked, as determined at 131, left side control is provided to the right solenoid at 133. Again, if the right side signals are present when checked at 127 the right side timer is reset at 135.

Next, if the left transfer is on at 137, meaning that the relay 105 is energized, and the right side transfer is on, meaning that the relay 107 is also energized at the same time as indicated at 139, the buzzer 101 and the light 103 are energized at 141 to alert the operator to the fact that adjustment signals for neither side are being generated. This could indicate that both detectors are blocked, that the projector is not generating the projected leveling plane, or perhaps that the boom has stopped moving. If either of the relays 105 or 107 is not energized the horn is silenced and the light is turned off at 143. The logic 111 is implemented by a timer interrupt repetitively at a rate such as five times per second.

Figure 5:
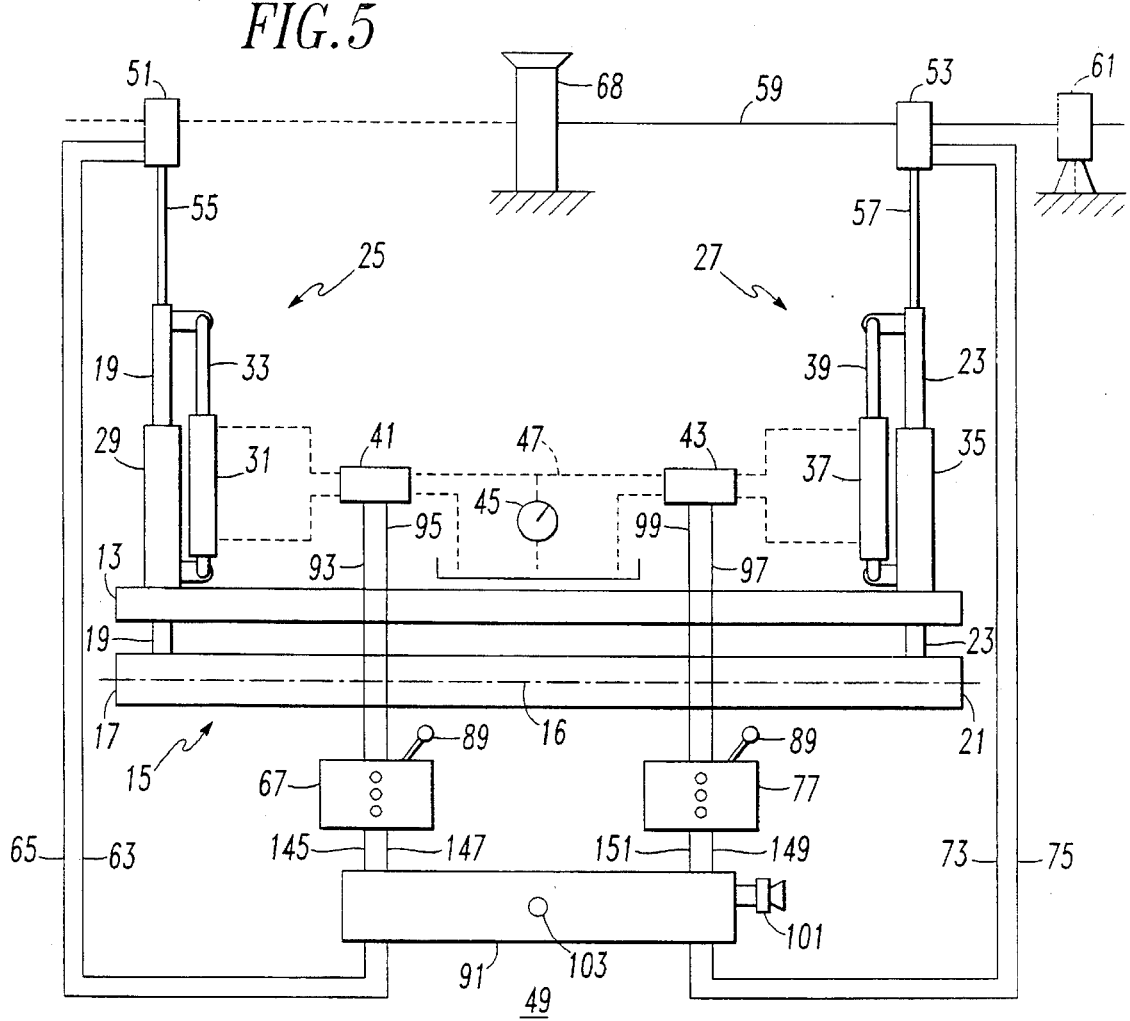
FIG. 5 is a schematic diagram of an alternate control system in accordance with the invention.

FIG. 5 illustrates a second embodiment of the invention wherein the switching control 91 is interposed between the detectors 51 and 53 and the controller units 67 and 77. Thus, the switching control 91 receives the continuous signals generated by the detectors. As it will be recalled, the detector 51, for instance, generates a steady high level logic signal on one or both of the leads 63 and 65 when it is seeing the laser beam. If the detector does not see the laser beam, a pulse signal is generated on both of the leads 63 and 65. Thus, the switching control 91 can immediately detect when the detector has been blocked. In this case, the switch control 91 applies the continuous detector signals from the unblocked detector to both of the controller units 67 and 77 over the leads 145, 147 and 149, 151. Thus, the controller unit 67 or 77 associated with the blinded detector would generate adjustment signals utilizing the detector signals from the unblinded detector.

For the embodiment of the invention shown in FIG. 5, the PLC 109 can use the same logic as shown in the flow chart of FIG. 4. In this instance, however, the timers could be set for a shorter interval the time interval in this ansient as soon as the PLC 109 detected a blocked detector.

The present invention provides a marked improvement in the operation of laser aligned apparatus for leveling flowable materials. By automatically providing adjustment signals to the solenoids associated with a blinded detector, a much smoother floor is produced. As the end of the elongated leveling member will be properly g an adjustment signal generated for the other end of the elongated leveling member is a very reasonable assumption of the signal that would have been available if the detector had not become blocked.

Thus, the adjustment that is needed when the blinded detector again picks up the project laser beam is very minor and does not appreciably affect the levelness of the floor.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for leveling a flowable material relative to a projected leveling plane established by a radiant energy beam in a location having obstructions which block said radiant energy beam from portions of said projected leveling plane, said apparatus comprising:

elongated leveling means having a longitudinal axis, a first end and a second end:

support means for supporting and moving said elongated leveling means generally transversely to said longitudinal axis, to level said flowable material, said support means including first elevation adjustment means for adjusting elevation of said first end of said elongated leveling means in response to a first adjustment signal, and a second elevation adjustment means for adjusting elevation of said second end of said elongated leveling means in response to a second adjustment signal; and radiant energy beam alignment means comprising:

first and second spaced apart radiant energy beam detectors carried by said elongated leveling means with said first radiant beam detector positioned adjacent said first end of said elongated leveling means and responsive to said radiant energy beam unless blocked by said obstruction for generating a first detector signal indicating relative elevation of said test radiant energy beam detector with respect to said projected leveling plane, and with said second radiant energy beam detector positioned adjacent said second end of said elongated leveling means and responsive to said radiant energy beam unless blocked by said obstruction for generating a second detector signal indicating relative elevation of said second radiant energy beam detector with respect to said projected leveling plane; and control means responsive to said first and second detector signals for generating said first adjustment signal associated with said first detector signal for application to said first adjustment means to adjust the elevation of said first end of said elongated leveling means when said first detector signal indicates that elevation of said first radiant energy beam detector deviates by more than a predetermined amount from said projected leveling plane, for generating said second adjustment signal associated with said second detector signal for application to said second adjustment means to adjust the elevation of said second end of said elongated leveling means when second detector signal indicates that elevation of said second radiant energy beam detector deviates by more than said predetermined amount from said projected leveling plane, switching control means for detecting an interruption in one of said first and second adjustment signals such as when one of said first and second radiant energy beam detectors is blocked from receiving said radiant energy beam by said obstruction, and for using the uninterrupted detector signal generated by said one radiant energy beam detector for generating both said first and second adjustment signals.

2. The apparatus of claim 1 wherein said switching control means only uses the detector signal generated by said one radiant energy beam detector for generating both said first and second adjustment signals after said one detector signal is the only detector signal received for a predetermined time interval.

3. The apparatus of claim 1 wherein said flowable material is uncured concrete and said support means comprises a movable frame, and a boom cantilevered from said movable frame and by which said elongated leveling means is movable generally transversely to said longitudinal axis.

4. The apparatus of claim 3 wherein said boom is supported by said movable frame at an angle to said projected leveling plane such that as said elongated leveling means moves, adjustment signals are repetitively generated by said control means to level said elongated leveling means relative to said projected leveling plane.

5. The apparatus of claim 4 wherein said control means comprises controller means generating said first and second adjustment signals and switching control means providing said first and second adjustment signals to said first and second elevation adjustment means respectively when both said first and second adjustment signals are being generated, and responsive to receipt of only one adjustment signal from said controller means for a pre-determined time interval for providing said one adjustment signal to both said first and second elevation adjustment means.

6. The apparatus of claim 1 wherein said control means comprises controller means generating said first adjustment signal in response to a detector signal indicating elevation relative to said projected leveling plane applied on an associated first input lead means and generating said second adjustment signal in response to a detector signal applied on an associated second input lead means, and switching control means for directing said first detector signal to said first associated input lead means and said second detector signal to said second input lead means when both detector signals indicating relative elevation are generated by said first and second radiant energy beam detectors, and when only one detector signal indicating elevation relative to said projecting leveling plane is present sending said one detector signal to both said first and second input lead means of said controller means.

7. The apparatus of claim 6 wherein said switching control means only sends said one detector signal to both said first and second input lead means of said controller means when said one detector signal is the only detector signal indicating elevation relative to said projected leveling plane for a pre-selected time interval.

8. A switching control for adapting apparatus for leveling flowable material in which an elongated leveling member has first elevation adjustment means adjusting elevation of one end of said elongated leveling member, a second elevation adjustment means adjusting elevation of a second end of said elongated level member, and a laser alignment system comprising first and second laser beam detectors mounted on said first and second ends of said elongated leveling member and responsive to a projected laser beam leveling plane for generating first and second detector elevation signals indicating elevation relative to said leveling plane, and controller means generating a first adjustment signal in response to said first detector signal for adjusting said first elevation adjustment means to align said first laser beam detector with said leveling plane and a second adjustment signal in response to said second detector elevation signal for adjusting said second elevation adjustment means to align said second laser beam detector with said leveling plane, said switching control comprising:

first and second input lead means and first and second output lead means, switching means for selectively connecting said first input lead means to only said first output lead means and alternatively to both output lead means, and for selectively connecting said second input lead means to only said second output lead means and alternatively to both said output lead means, and processor means responsive to signals on said first and second input lead means for operating said switching means to connect said first input lead means to said first output lead means only and said second input lead means to said second output lead means only when signals are present on both said input lead means, and in the absence of a signal on one input lead means for operating said switching means to disconnect said one input lead means from an associated output lead means and to connect the other input lead means to both output lead means, and means connecting said switching means with said laser alignment system such that when one of said laser beam detectors is blocked from receiving said projected laser beam and no longer generates a detector elevation signal, a signal is present on only one input lead means and therefore both said first and said second adjustment signals are generated using the other detector elevation signal.

9. The switching control of claim 8 wherein said processor means includes delay means for delaying said operating of said switching means to connect said other input lead means to both output lead means until said signal is absent on said one input lead means for at least a pre-determined time interval.

10. The switching control of claim 9 wherein said processor means operates said switching means to reconnect said one input lead means to said associated output lead means and to disconnect said other input lead mean from said output lead means associated with said first input lead means when both said first and second detector elevation signals are again detected.

* * * * *